United States Patent

Nitami et al.

[11] 3,910,686
[45] Oct. 7, 1975

[54] LENS MOUNT FOR A MICROSCOPE OBJECTIVE

[75] Inventors: Takasi Nitami, Irima; Yosikazu Ito, Hachiouji, both of Japan

[73] Assignee: Olympus Optical Co., Ltd., Japan

[22] Filed: Jan. 18, 1974

[21] Appl. No.: 434,646

[30] Foreign Application Priority Data
Nov. 8, 1973 Japan............................. 48-124915
Jan. 25, 1973 Japan................................. 48-9947

[52] U.S. Cl. ................................ 350/252; 350/178
[51] Int. Cl.² ............................................ G02B 7/02
[58] Field of Search .......... 350/245, 247, 252, 255, 350/178

[56] References Cited
UNITED STATES PATENTS

| | | | |
|---|---|---|---|
| 1,557,503 | 10/1925 | Sabel | 350/252 |
| 1,722,520 | 7/1929 | Glancy | 350/252 |
| 2,258,223 | 10/1941 | Sachtleben | 350/252 |
| 2,423,491 | 7/1947 | Fairbank | 350/252 |
| 3,249,008 | 5/1966 | Angenieux | 350/247 |
| 3,560,080 | 2/1971 | Wilczynski | 350/247 |

*Primary Examiner*—Alfred E. Smith
*Assistant Examiner*—Michael J. Tokar
*Attorney, Agent, or Firm*—Cushman, Darby & Cushman

[57] ABSTRACT

A lens mount for a microscope objective comprising an inner cylinder having centering holes provided for respective carrying rings for respective lenses and having stepped portions on the inner surface of said inner cylinder for the purpose of facilitating proper adjustment of airspaces between respective lenses and centering of respective lenses.

3 Claims, 2 Drawing Figures

LENS MOUNT FOR A MICROSCOPE OBJECTIVE

BACKGROUND OF THE INVENTION

1. Field of the Invention

The present invention relates to a lens mount for a microscope objective.

2. Description of the Prior Art

Conventional lens mounts for microscope objectives have a construction as shown in FIG. 1. In said figure, numerals 11, 12, . . . designate respective lenses of the objective numerals 21, 22, . . . designate carrying rings to which respective lenses 11, 12, . . . are fixed by the method according to the known art, numeral 30 designates a spacer ring, numeral 31 designates a retaining ring, numeral 32 designates an inner cylinder, numeral 33 designates an outer cylinder and numeral 34 designates an objective cylinder. To assemble the lens mount of the above-mentioned construction, respective carrying rings 21, 22, . . . , for which lenses 11, 12, . . . are respectively mounted, are inserted into the inner cylinder 32, the spacer ring 30 is also inserted and, then, they are fixed by inserting the retaining ring 31. At the time of assembling as above, tin foils are inserted between respective carrying rings for adjusting airspaces between respective lenses 11, 12, 13, . . . to desired values. Besides, to align lenses, a centering pin is inserted to centering holes 32a, which are radially provided at four places on the circumference of the inner cylinder 32 at the position where the carrying ring 22 for the second lens is inserted, and said centering pin is tapped by a mallet. When, however, the lens mount is assembled by the above-mentioned conventional method, adjustment is very difficult. Moreover, as adjustment is made only by the second lens and the other lenses are not adjusted, it is difficult to attain high adjusting accuracy. As the other adjustments cannot be also made really satisfactorily, it is difficult to maintain the microscope objective in very favourable condition that the resolving power is high and the image of the object to be observed is very favourable. Furthermore, as all carrying rings are fixed by only one retaining ring, it is comparatively difficult to maintain the initial accuracy of the microscope objective for a long time. Thus, the conventional method has various disadvantages.

SUMMARY OF THE INVENTION

It is, therefore, a primary object of the present invention to provide a lens mount for a microscope objective arranged so that centering adjustment can be made for all lenses accurately by providing centering holes to the inner cylinder at positions where respective carrying rings are to be located when said carrying rings are inserted into the inner cylinder.

Another object of the present invention is to provide a lens mount for a microscope objective having stepped portions formed on the inner surface of the inner cylinder for the purpose of positioning carrying rings to which lenses are fixed.

Still another object of the present invention is to provide a lens mount for a microscope objective having a stepped portion on the outer surface of the inner cylinder for the purpose of adjusting the equivalent focal length.

DETAILED DESCRIPTION OF THE PREFERRED EMBODIMENT

Figure 2:
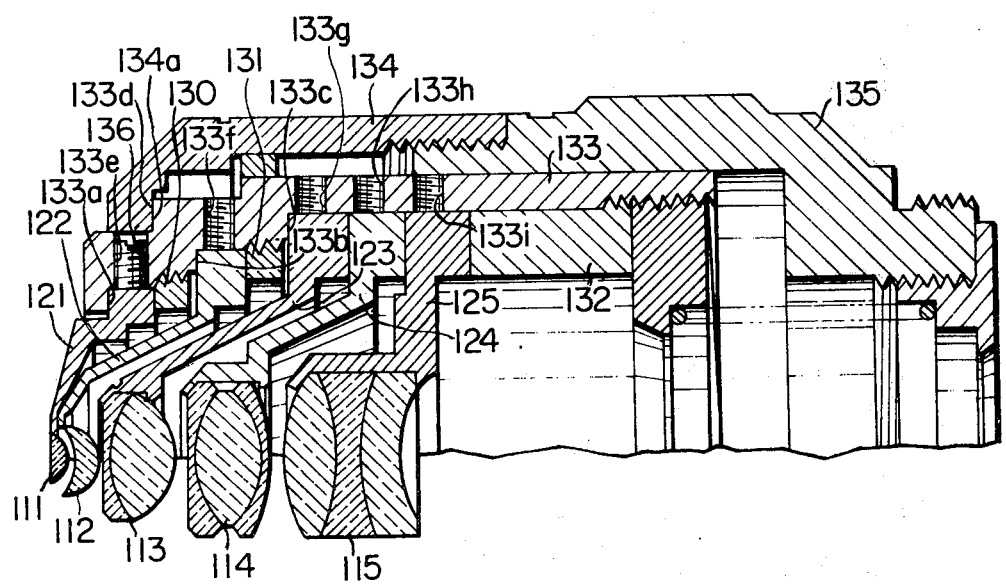
FIG. 2 shows a sectional view of the lens mount for a microscope objective according to the present invention.

Concentrate details of the lens mount for a microscope objective according to the present invention are as described below. In FIG. 2, numerals 111, 112, . . . represent respective lenses of the objective, numerals 121, 122, . . . respectively represent carrying rings to which said lenses 111, 112, . . . of the objective are respectively fixed by the known method, and numerals 130, 131 and 132 respectively represent retaining rings. Numeral 133 represents an inner cylinder. On the inner surface of said inner cylinder 133, stepped portions 133a, 133b and 133c are provided for the purpose of positioning the first lens 111, second lens 112 and the third lens 113 so that airspaces between respective lenses can be adjusted to pre-determined proper values. On the outer surface of said inner cylinder 133, a stepped portion 133d is provided for the purpose of adjusting the equivalent focal length. Besides, said inner cylinder 133 has, at positions where said carrying rings 121, 122, . . . are to be inserted and located, five groups of four holes 133e, 133f, 133g, 133h and 133i are provided for the purpose of centering respective lenses of the objective. On inner surfaces of said centering holes, screw threads are formed respectively. Numeral 134 represents an outer cylinder having a stepped portion 134a, on its inner surface, which is to contact said stepped portion 133d for adjusting the equivalent focal length formed on the outer surface of said inner cylinder 133. Numeral 135 represents an objective cylinder.

The assembling and adjusting methods of the lens mount for a microscope objective arranged as described in the above are as follows. At first, carrying rings 121, 122, . . . to which respective lenses 111, 112, . . . are fixed are inserted to the inside of the inner cylinder 133 and respective carrying rings are fixed by screwing respective retaining rings 130, 131 and 132. When fixing these carrying rings, airspaces between respective lenses 111, 112, . . . of the objective are adjusted to proper values by cutting surfaces of stepped portions 133a, 133b and 133c for position adjustment which are formed on the inner surface of the inner cylinder 133 and, then, carrying rings are fixed by retaining rings 130, 131 and 132. Besides, by utilizing centering holes 133e, 133f, 133g, 133h and 133i provided to the inner cylinder 133, respective lenses are aligned accurately. After aligning as above, screws 136 are screwed into threads which are formed on inner surfaces of those centering holes to fix all carrying rings and, then, are bound by a binding agent. Though FIG. 2 shows only one screw 136 which is mounted to the centering hole 133e for centering the first lens 111, it is a matter of course that said screws 136 are provided for all other centering holes in the same way for fixing the other carrying rings. Finally, the outer cylinder 134 is fitted, the equivalent focal length is set properly by making adjustment by cutting the stepped portion 133d for adjusting the equivalent focal length and, then, the objective cylinder 135 is mounted, thus assembly and adjustment of the lens mount are completed.

Figure 1:
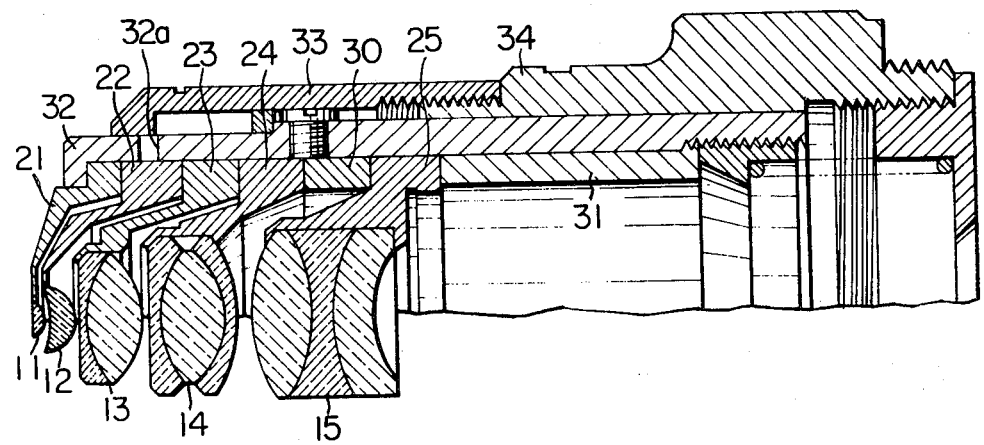
FIG. 1 shows a sectional view of the conventional lens mount for a microscope objective.

As described in the above, the lens mount for a microscope objective according to the present invention can be assembled and adjusted in a simpler way compared with the conventional lens mount shown in FIG. 1 and can be assembled with higher accuracy. That is, as the lens mount for a microscope objective according to the present invention is so arranged that airspaces between respective lenses can be adjusted by cutting stepped portions for position adjustment which are provided on the inner surface of the inner cylinder 133, it is possible to adjust airspaces with higher accuracy by an easier way compared with the adjusting method by using foils which is adopted for the conventional lens mounts for microscope objectives. Furthermore, as centering holes are provided to said inner cylinder for all of carrying rings respectively, centering adjustment can be made for all lenses and, therefore, extremely high centering accuracy can be achieved. Besides, as respective carrying rings to which respective lenses are fixed are clamped by retaining rings and, at the same time, all carrying rings are fixed by utilizing threads formed on inner surfaces of said centering holes, it is possible to prevent deterioration of resolving power and quality of the image of the object to be observed. In other words, accuracy of the lens mount for the microscope objective does not decrease even when it is used for a long period of time. In addition, it is possible to set the equivalent focal length by using said stepped portion for adjusting the equivalent focal length.

We claim:

1. A lens mount for a microscope objective comprising carrying rings holding respective lenses and an inner cylinder having stepped portions for deciding positions of said carrying rings on the inner surface of said inner cylinder and also having centering holes at those positions where said carrying rings are positioned respectively.

2. A lens mount for a microscope objective according to the claim 1 further having internal threads formed on inner surfaces of said centering holes respectively and further comprising male screws to be screwed into said centering holes respectively for fixing said carrying rings.

3. A lens mount for a microscope objective according to the claim 1 having a stepped portion for deciding the equivalent focal length on the outer surface of said inner cylinder.

* * * * *